US008266040B2

(12) United States Patent (10) Patent No.: US 8,266,040 B2
Segal et al. (45) Date of Patent: Sep. 11, 2012

(54) VIRTUAL TRADING FLOOR SYSTEM AND METHOD

(75) Inventors: Dror Segal, New York, NY (US); Anne E. Allen, Cranford, NJ (US); Mark Hicks, Staten Island, NY (US)

(73) Assignee: New York Stock Exchange LLC, New York, NY (US)

( * ) Notice: Subject to any disclaimer, the term of this patent is extended or adjusted under 35 U.S.C. 154(b) by 2909 days.

(21) Appl. No.: 09/774,768

(22) Filed: Jan. 31, 2001

(65) Prior Publication Data

US 2002/0133449 A1 Sep. 19, 2002

Related U.S. Application Data

(60) Provisional application No. 60/179,296, filed on Jan. 31, 2000.

(51) Int. Cl.
*G06Q 40/00* (2012.01)
(52) U.S. Cl. ............................................. 705/37; 705/35
(58) Field of Classification Search .................... 705/35, 705/37
See application file for complete search history.

(56) References Cited

U.S. PATENT DOCUMENTS

| | | | | |
|---|---|---|---|---|
| 4,412,287 | A | * | 10/1983 | Braddock, III ................. 705/37 |
| 5,675,746 | A | * | 10/1997 | Marshall ......................... 705/35 |
| 6,381,583 | B1 | * | 4/2002 | Kenney ........................... 705/26 |
| 2003/0126068 | A1 | * | 7/2003 | Hauk et al. ...................... 705/37 |

FOREIGN PATENT DOCUMENTS

| | | |
|---|---|---|
| JP | 2003-345952 | 12/2003 |
| JP | 2003-345953 | 12/2003 |
| WO | WO 98/45830 | 10/1998 |

OTHER PUBLICATIONS

"Virtual reality trading floor adds new dimension", Computerworld. Framingham: Mar. 29, 1999. vol. 33, Iss 13; p. 67. New York Stock Exchange, NYSE Jaikumar Vijyan.*
"Virtual reality 2.0", Fennella Saunders. Discover. Chicago: Sep. 1999. vol. 20, Iss 9: p. 32, 2pgs.*
You Are About to Travel Into Another Reality,Tom Ashbrook; Boston Globe, Jul. 28, 1988 p. 5.*
Ivy Schmerken. "Real Liffe or virtual reality." Wall Street & Technology. New York: Jan. 1997. vol. 15, Iss. 1; p. 70, 3 pages.*
Dean Tomasula. "Virtual Trading is Virtually a Reality." Wall Street & Technology. New York: Oct. 1995. vol. 13, Iss. 10; p. 44, 3 pgs (4 pages total).*
B. Delaney, "The NYSE's 3D Trading Floor", IEEE Computer Graphics and Applications, vol. 19, No. 6, pp. 12-15; Nov./Dec. 1999; XP002171186.
K. Moltenbrey, "Taking Stock", Computer Graphics World, pp. 41-44, Oct. 1999; XP001011554.
Andia et al., "Architects design in cyberspace and real space for the NYSE", Aug. 1999; www.members.tripod.com; XP002171187.
Gobbetti et al., "I3D: an interactive system for exploring annotated 3D environments", Center for Advanced Studies, Research and Development in Sardina; pp. 16-30; Sep. 1995; XP001011596.
"New York Stock Exchange Employs Silicon Graphics Technology in its Advanced Trading Floor Operations Center", SGI Press Release; Mar. 9, 1999; www.sgi.com/newsroom/press_releases; XP002171189.

* cited by examiner

*Primary Examiner* — Elizabeth Rosen
(74) *Attorney, Agent, or Firm* — Baker Botts L.L.P.

(57) ABSTRACT

An interactive decision support system for monitoring and responding to system and market events displayed within a two dimensional view of a three dimensional system model.

23 Claims, 9 Drawing Sheets

VIRTUAL TRADING FLOOR SYSTEM AND METHOD

RELATED APPLICATIONS

This application claims priority to provisional application 60/179,296 filed Jan. 31, 2000, entitled "Virtual trading floor system and method."

BACKGROUND OF INVENTION

This invention relates to an interactive decision support system for monitoring and responding to system and market events displayed within a two dimensional view of a three dimensional system model.

In connection with managing operations of a trading market, such as the New York Stock Exchange®, it is important for management personnel to be aware of exceptional events relating to business activity. Exceptional events include unusual trading activity in a particular security, or unusual systems activity such overload of system components or component failures. In addition, exchange managers, compliance officers, security traders and analysts have a need for quick and easy access to the enormous volume of data which characterize various aspects of the financial market, such as the real time price and volume of a traded security, as well as outstanding booked orders.

Accordingly, there has been a need for facilitated access to numerous types of information concerning the trading and systems activity of a financial exchange which allows an individual to investigate detailed aspects of trading and system activity while maintaining watch over the overall activity of the exchange.

It is an object of the invention to provide a system which permits an operator to assimilate a large amount of information in a quick, easy and intuitive manner.

It is a further object of the invention to provide a system which facilitates management of a trading floor from a centralized location.

It is a further object of the invention to provide a system which presents information of varying relative importance in a manner which allows an operator access related to detailed information for investigation while maintaining an overview of major events.

It is further an object of the invention to provide an interactive decision support system for monitoring and responding to system and market events as they occur using a two dimensional view of a three dimensional model which facilitates the task of monitoring a large amount of information and provides a ready means for a user to react.

SUMMARY OF THE INVENTION

The interactive decision support system, or three dimensional trading floor system, consolidates the data streams of NYSE® operational activity into one interactive three-dimensional visualization system to allow a user to monitor and respond to systems and stock-related events. The interactive decision support system is a virtual representation of the trading floor that enables operators of the NYSE® to pinpoint complex systems and stock related activity with visual clarity. The operators can drill down to view specific information about specific activities, even inside walls and under the floors of the exchange. The exact magnitude and effect on related or peripheral activities can be recognized and understood at-a-glance and in real time as they occur. Real time data is integrated from several sources to create a visual display that uses three dimensions, animation, colors and geometric shapes to identify business and systems events, thereby creating an environment where information gathering is intuitive. Live and recorded video feeds can be transmitted into the model as the user desires. The interactive support system provides a user with the capability to anticipate and respond to surges in trading activity and to distribute system resources as necessary. Business and system events are inserted into the display and accompanied with English language explanations of the events, recovery times, business impact and user response. The virtual trading floor therefore allows operations staff to make more informed decisions and respond to events at a faster pace than is currently available. In addition, the interactive decision support system provides a user with a means to supervise market activity to ensure and enforce compliance with financial and operational requirements, perform periodic checks on broker's sales practices, and monitor specialist operations.

Accordingly, a method is provided for displaying data representing the operation of an exchange which includes maintaining data representing a three dimensional model of the exchange's trading area and receiving and maintaining in a computer memory data representing exchange operations. The method generates a two dimensional display representing a selected aspect view of the three dimensional model and including perspective views of some of the surfaces of the model. The method further generates alphanumeric images of selected data representing exchange operations and maps these images onto surfaces of the perspective views.

The method further provides changing the selected aspect view of the three dimensional model upon a new view being selected by a user. The method generates an additional two dimensional display representing the changed aspect view, and maps the alphanumeric images onto selected ones of the perspective views in the additional two-dimensional display. In addition, the method provides portions of the two dimensional display as being selectable and that these selectable display portions are operable so that, when these portions are selected by a user, further data correlated to the selectable display portions is displayed. The method also provides that some of the selectable display portions comprise the perspective aspect views and where further data is correlated to data represented by the alphanumeric images, this data is mapped onto the perspective aspect views.

Figure 1:
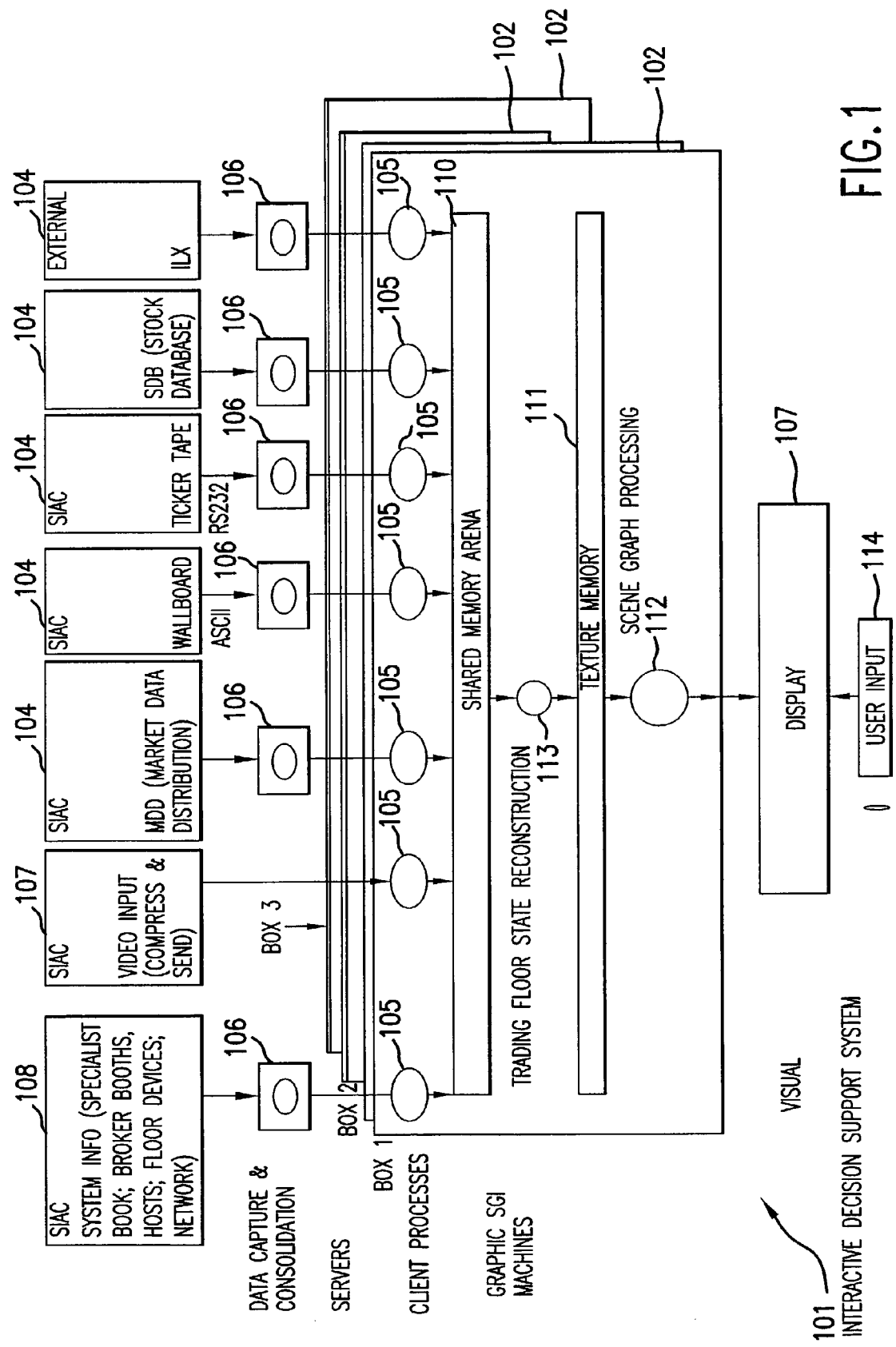
FIG. 1 is a block diagram showing a system according to the present invention.

Throughout the figures, the same reference numerals and characters, unless otherwise stated, are used to denote like features, elements, components or portions of the illustrated embodiments. Moreover, while the subject invention will now be described in detail with references to the figures, it is done so in connection with the illustrative embodiments. It is intended that changes and modifications can be made to the described embodiments without departing from the true scope and spirit of the subject invention as defined by the appended claims.

DESCRIPTION OF THE PREFERRED EMBODIMENT

FIG. 1 is a block diagram of an interactive decision support system 101 according to the invention. The interactive decision support system 101 comprises data sources 103, data servers 106, data processors 102, and displays 107 to provide a virtual trading floor 201.

Data sources 103 include internal financial data sources 104, external data sources 107 and internal system data sources 108 which provide both real time and archival data. Data sources generated internally within the Securities Industry Automation Corporation (SIAC) and New York Stock Exchange® (NYSE®) include Consolidated Tape System tickers which provide the old-style stock ticker for current stock trading information; a Market Data Distributor (AMDD) providing numerous stock attributes among other things, and the Wall Board, providing textual news items with screen formatting. External sources of data include ILX, which provides information pertaining to indexes, global information and hot news.

Each of the data sources 103 provide data representing exchange operations, some live and some historical, in particular formats and at various rates. The data from the market data sources 103 is captured, consolidated and converted into a predetermined format by data normalizing servers 106. A programmed computer or a hardwired machine can perform the function of the data normalizing servers 106. Each market data source 103 can be provided with an associated data normalizing server 106 or the functions of the data normalizing servers 106 can be integrated into a single machine for normalizing the data from the several data sources 103. Each data normalizing server 106 distributes the formatted data to one or more data processors 102.

Data sources 103 include current market activity, comprising news and financial information such as stock price, stock trading volume, selected historical records, round lots, odd lots, daily average stock volume, trades, volume by size of trade, distribution of trades by trade size, most active stocks, block transactions, member trading, market performance, average quotation spreads, program trading, circuit breakers, trading systems, warrants, consolidated tape activity and off-hours trading among other things. Data sources 103 can include selected stock price trends, such as composite index of selected stock of high capitalization companies, daily closings, growth rates, stock price volatility, yield and P/E ratio, among other things. Data sources 103 can also include information about selected companies such as listing requirements, shares listed, market value, warrants listed, market value leaders, changes in NYSE list, new listings, removals, name changes, stock distributions, and splits among other things. Other data sources 103 can include information about the ownership of corporate entities and information about the investing public, such as total number of shareholders, profiles of shareholders, share ownership by census region, characteristics of adult shareowners, and share ownership highlights among other things. Some data sources 103 can include information about international financial activity such as stock transactions between U.S. and foreign investors, foreign stock prices, indexes, volume in non-U.S. stocks, volume and value of non-U.S. trading, stocks of non-U.S. corporate issuers listed by geographic region, market capitalization of NYSE-listed non-U.S. stocks by geographic region, and stocks of non-U.S. corporate issuers. Data items relating to bonds can be provided by the data sources 103 such as data related to the NYSE fixed income market, bond volume, bond trading records, most active bonds, largest corporate new listings, issuers listing debt, and amortized bond system subscribers among other things.

In addition, system data sources 108 are provided for supplying data from various internal systems of the actual stock exchange. Each system data source 108 provides data from a domain within the exchange, such as the specialist posts, the trading terminals, the display books, the broker booths, the network support systems and/or other physical devices at the exchange. Each system data source 108 provides data in particular formats and at various rates. The data from the system data sources 108 is captured, consolidated and converted into a predetermined format by data normalizing servers 106 by means similar to those described above.

The interactive decision support system 101 provides for one or more data processors 102 which receive the formatted data from the data servers 106. Other direct data sources 107, such as video conferencing information, can be provided directly to the data processor 102. Each data processor 102 has the capacity to control one or more other data processors 102.

Each data processor 102 can be provided with at least one data client 105, a shared memory area 110, a trading floor reconstruction map 113, a texture memory map 111, and a scene graph renderer 112. The data clients 105 receive the formatted data from the data normalizing servers 106 or directly from the other direct data sources 107. Data clients 105 process the formatted data and write the data to predetermined locations in a shared memory arena 110, thereby building tables of data which are updated by the data clients 105 in real time as data is received from the data servers 106. The predetermined locations can represent a classification of data items to reflect the character of the formatted data received and stored in those predetermined locations. The rate at which the tables of data in the shared memory area 110 can be updated and the number of individual events represented by the data received by the data clients 105 is limited in part by the central processing unit speed of the data processor 102. Thus, the frequency with which a data item is submitted to the shared memory area 110 can be limited to a level which provides sufficient meaningful information according to the preferences of the user while avoiding burdening the data processor 102 with unnecessary update operations. Similarly, the number of data items to be accepted by the data processor 102 from the data clients 105 can be limited to prevent the number of data items stored in the shared memory area 110 from growing too large and interfering with the data processors 102 capacity to update data items with the preferred frequency. Accordingly, the shared memory area 110 is preferably populated with only preselected data items representing information of greatest importance to the user.

Data stored in the shared memory arena 110 is consolidated by the trading floor state reconstruction system 113, which begins a process of transforming raw data into a state associated with a three-dimensional model of the virtual trading floor thereby creating alphanumeric images. The data is written to a texture map memory 111 in a predetermined manner, associating data with texture information. Data in the texture map memory 111 is rendered into a three-dimensional model by a scene graph processor 112 which maps each texture and associated data onto a predetermined grid or grids of a pre-programmed wireframe model of the virtual stock exchange. Viewpoint information from a user input device 114 or control station, such as a keyboard or mouse device, informs the scene graph processor 112 of the viewpoint from which to display the rendered model of the virtual trading floor. Accordingly, the scene graph processor 112 culls and draws an image of the virtual trading floor from the perspective of the viewpoint, which image can be viewed on a display 107. Thus, selected data can be taken to generate alphanumeric images according to the perspective view.

The interactive decision support system 101 can provide graphical representation of real time data on at least one display monitor 107 which can be located remotely or in an exchange control room located adjacent the actual trading floor of the NYSE. As implemented for the New York Stock Exchange® (NYSE®), the display monitor 107 comprises 9 high resolution flat panel monitors, supplied by PixelVision. Nine 25 inch monitors 107 are used to provide a two-dimensional view of a three dimensional model of the exchange trading floor and selected detailed views of the three dimensional model for display of selected data or information in graphic or tabular form. Alternatively, the display monitor 107 can be a single display monitor used to view the virtual trading floor.

A control station provides a user input 114 to select an aspect view and control the images displayed on the display 107. The control station can be a client computer at which the user input 114 can direct the scene graph processor 112 to display different levels of detail, from a large scale overview to a "drill down" view of a selected element. The drill down view of an element displayed in the overview is a detailed view of the element which can be provided in a separate window or monitor and has additional information such as data and graphical representations of data not shown in the overview of that element. In addition to use of multiple monitor displays, the control station can direct multiple views within a single monitor display 107. The views of an element to be provided upon selection by a user can be customized to fit the particular interests of the individual user. Similarly, navigation through the virtual trading floor is provided by the control station, as well as interaction with elements of the trading floor. This will be described later in further detail.

When a user selects a particular view of the virtual trading floor, coordinate information representing the position, orientation and zoom level for that view is communicated from the user input 114 to the scene graph renderer 112 of the data processor 102. The scene graph renderer 112 processes the request by mapping the appropriate viewpoint information, as mentioned above, and returns to the display 107 the rendered image. It is generally preferable that the three dimensional processing of the image be performed by the data processor 102 since the computations required for rendering the image generally require sophisticated and substantial processing and therefore can be preferable to center such processing power at the data processor or server side such as the Silicon Graphics super-computer which can be tailored to this task. In other instances it can also be preferable that the scene rendering be performed on the server side where the rendering requires sophisticated processing or when the same scene information can be distributed to a number of client machines located at the user input 114, thereby saving overall processing power by processing the scene once at the server and distributing the scene to all clients requesting common display images. For example, the data processor 102 can continuously consolidate and summarize the formatted data to produce distilled states of the market and of different elements in the market and which can be readily called upon by client requests. In addition, the data processor 102 can perform data mining and anticipate client requests for analysis of exceptional events. One purpose of selective processing is to optimize the resources of the system on which the virtual trading floor is implemented. It can be appreciated that specific choices of selective processing may be varied on a case by case basis depending on the processing power of the central server and the peripheral client machines, as well as the available bandwidth for communicating information from the server to the client, the type of information being sent, and the frequency the data is being updated among other factors.

Other aspects of the display can be maintained on the client side at the location of the display 107 and user input 114. Information which does not require three dimensional rendering, such as the alphanumeric information that can be provided in the dashboard, can be communicated directly as data to a client side computer at the user input and display for local processing and rendering. For example, time series data can be maintained by the client to be updated by the server and the client can create and update any simple graphs or analysis based on the data. Thus, certain processing can be delegated to the client and save the processing power of the server for specialized tasks. It can be appreciated that other factors can be considered such as the degree to which the individual client machine requires customized display of information.

Figure 2:
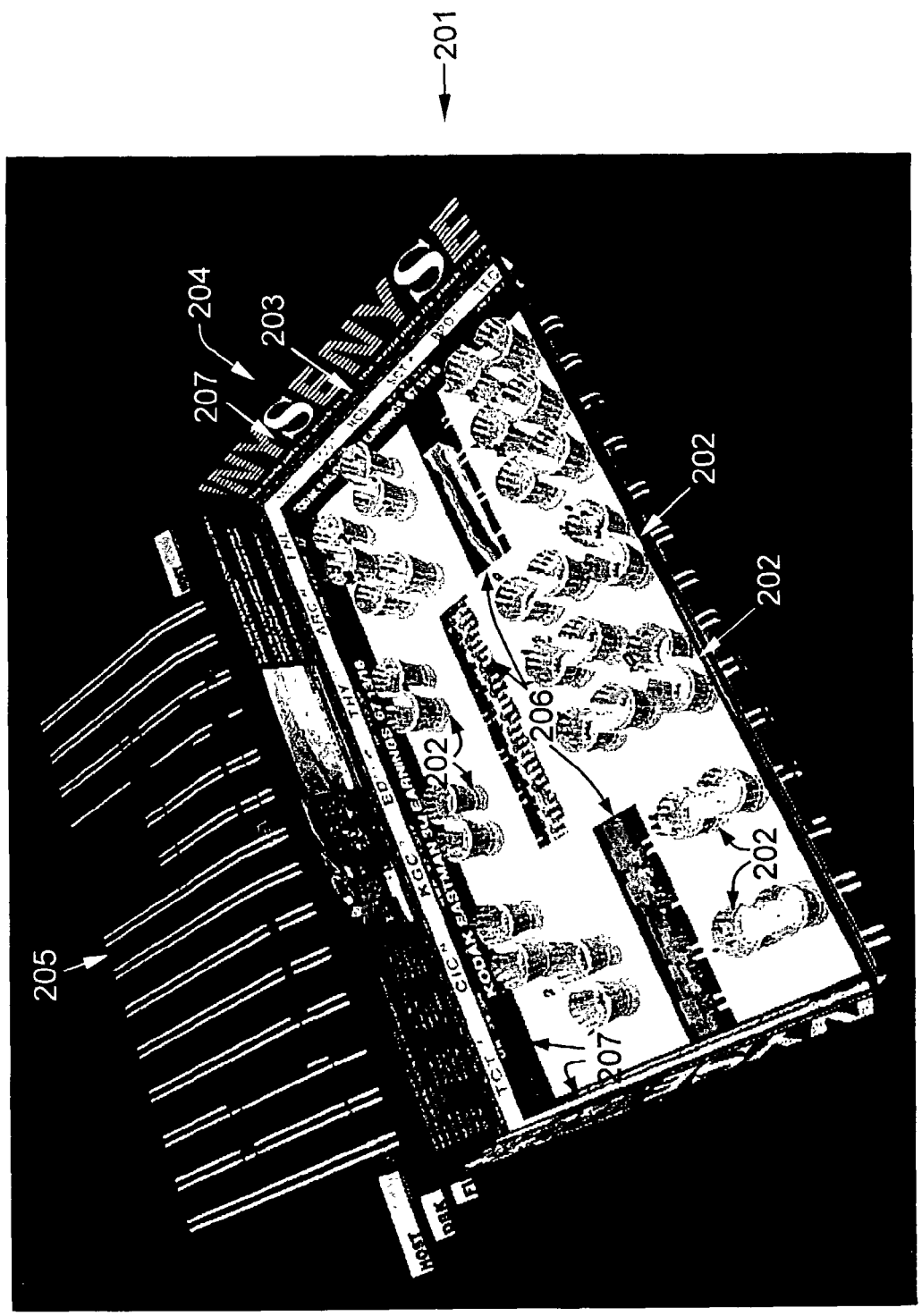
FIG. 2 is an image generated by the FIG. 1 system showing an overhead view.
Figure 3:
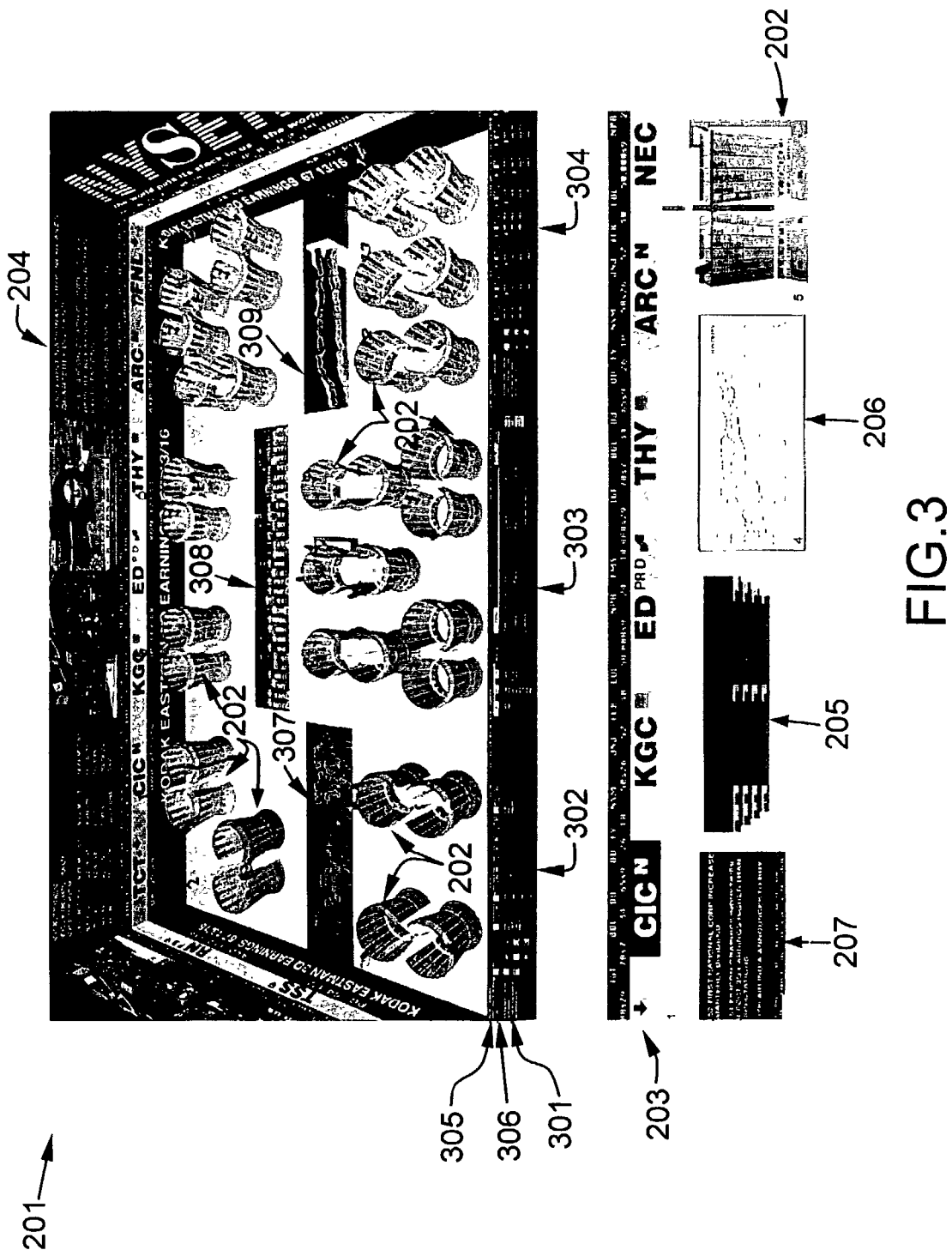
FIG. 3 is another image generated by the FIG. 1 system showing an overhead view and multiple drill down windows.

The data processor 102 is implemented using several computers including six Silicon Graphics Onyx2 graphics visualization supercomputers utilizing Silicon Graphics Iris Performer for processing the market data and three dimensional graphical representation of data and the virtual trading floor 201 depicted in FIG. 2. FIG. 3 illustrates a composite view 300 of the three-dimensional virtual trading floor 201 and a dashboard 301 which can be shown as a typical large scale view on the display 107. Four supercomputers are located at the NYSE® site to support the three-dimensional model and data flow to the monitors 107 and two additional supercomputers are located at the remote site housing the data servers 106 to support the flow of market data into the interactive decision support system 101.

The interactive decision support system 101 of the present invention utilizes a computerized three dimensional model of the stock exchange trading floor to provide a vehicle for efficient display of real time data and visualization of all components of a virtual trading floor 201. Specifically, a simplified three dimensional model of the trading floor is maintained in the interactive decision support system 101. Two dimensional views of the model can be provided for display on the monitor 107 such as a nine-monitor composite display for the exchange managers. In the actual trading floor of the NYSE®, trading stations are arranged around the periphery of trading posts, which include electronic displays and terminals to provide order data to traders and to enable floor personnel of members to enter transactions using trading floor terminals. Similarly, the virtual trading floor 201, provides several virtual trading posts 202 each of which represent the centers of trading activity for a number of securities. Also provided on the composite view 300 of the virtual trading floor 201 are a ticker tape displays 203, a background wall 204, facilities 205, several containers 206 and a dashboard 301.

One or more ticker tapes 203 can be provided as one or more strips which run along three visible panels 207 of the background wall 204. The ticker tape display 203 is a two-dimensional representation of a ticker tape derived from live, streaming data from data sources 103. The ticker tape display 203 can include an alerted stock ticker tape, news ticker tape and/or a selected stock list ticker tape.

Figure 4:
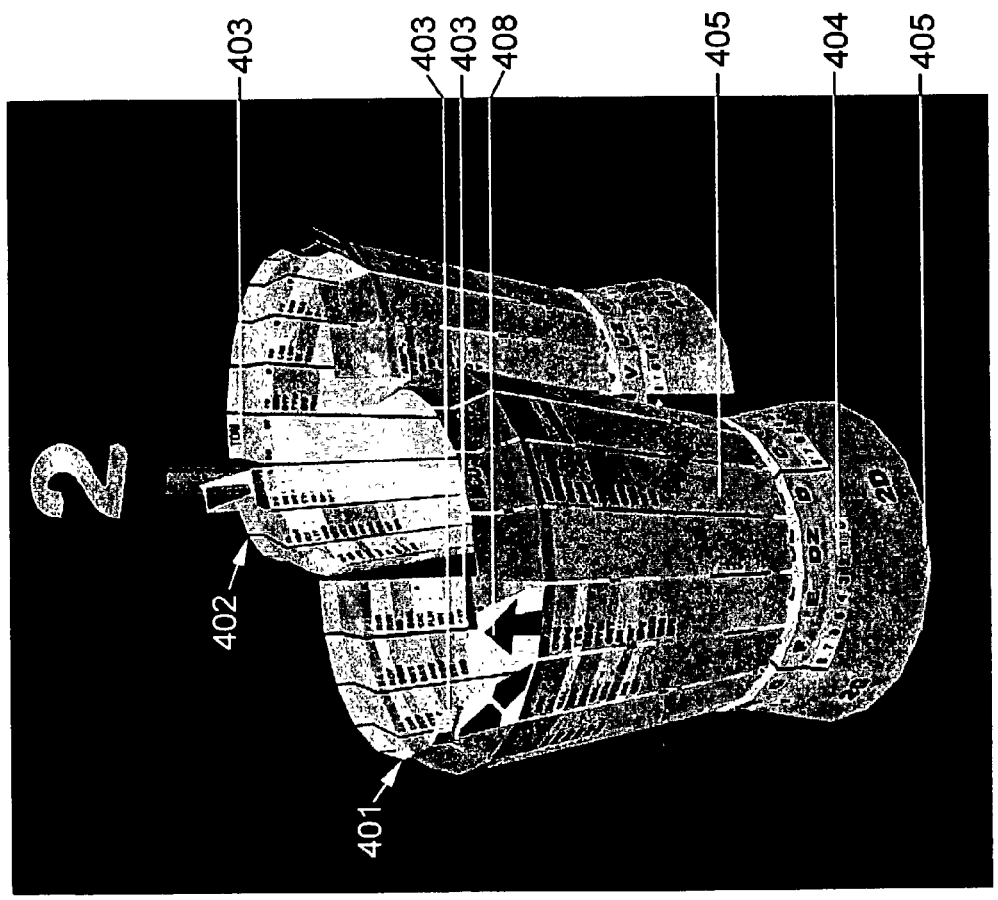
FIG. 4 is another image generated by the FIG. 1 system showing a drill down detailed view of a virtual trading post.

FIG. 4 shows a detailed two dimensional view of a three dimensional model of the virtual trading post 202 for purposes of explaining components thereof. The virtual trading post 202 includes multiple display surfaces 405 on which data, such as the trading symbol of each security traded at the post and the last transaction price, can be displayed. Referring to FIG. 4, it can be seen that each virtual trading post 202 has two post columns 401 and 402, which include display panels 404. The display panels 404 have several display surfaces 405 for security labels 403 corresponding to a security traded at a corresponding trading post on the actual trading floor of the exchange. The display panels 404 in the three dimensional model are arranged vertically around the periphery of each column of the virtual trading post 202, preferably arranged in alphabetical or other logical order.

In addition, each display surface 404 can be provided with a cap panel 408 at the top. The cap panel 408 functions as an alert to the status of a stock in the corresponding display surface 404. If the status of a stock is exceptional, the cap panel flags an alert by adopting a color and a symbol for the type of alert. If two or more exceptional conditions occur on one panel, the colors and/or symbols of the flag can be shown to alternate. Alerts can be provided to indicate business events that effect individual stocks or stock related by a predefined user group, stock index, industry or industry sub-group, country or geographic area or other event, such as a news headline. Detailed information concerning the alert is accessible to the user by selecting the panel to obtain a drill down view of detailed information.

Exceptional conditions can include business exceptions and system exceptions. Business exceptions include price, trade, velocity, queue, message, stock not open, stock halted, news and hot news, among other things. System exceptions can include server down, book down, stock down, loss of floor connectivity, and loss of host connectivity, among other things. An operator can click on the display segment to call up information concerning the item selected.

Exceptional conditions for securities can be set according to several rules defined by thresholds, stock opening, delays or halts in trading, market conditions or particular news. A threshold is the point or points at which certain types of activities or events cause a stock symbol to be flagged with an indicator or icon that describes the class and intensity of the event or activity. Threshold exceptions may be grouped and categorized by price change, such as net price change in absolute value, net percept price change as a measure of relative value, and spread; trade information, such as NYSE® block trades, reported trades, regional trades, and total volume; order velocity and specialist orders to name a few. Exceptions based upon stock opening are indicators of the status of the trading of a particular stock when the market opens at 9:30 a.m. Any stock that does not open appears as an exception on a panel of the associated trading post. At 9:45 a.m. the exception is escalated to a warning and at 10:00 a.m. the exception is escalated again until the stock is opened. Exceptions related to delays or halts in trading relate information about those stocks that have been flagged due to news or order imbalances. Market exceptions reflect implementation of Rule 80a (which restricts index and arbitrage trading when the Dow Jones Industrial Average is down 2%) and Rule 80b (which implements "circuit breakers" which halt trading when the Dow Jones Industrial Average is down 10%, 20% or 30%). Furthermore, the symbol of a stock with a "hot" news headline can be flagged for a users attention.

Figure 5:
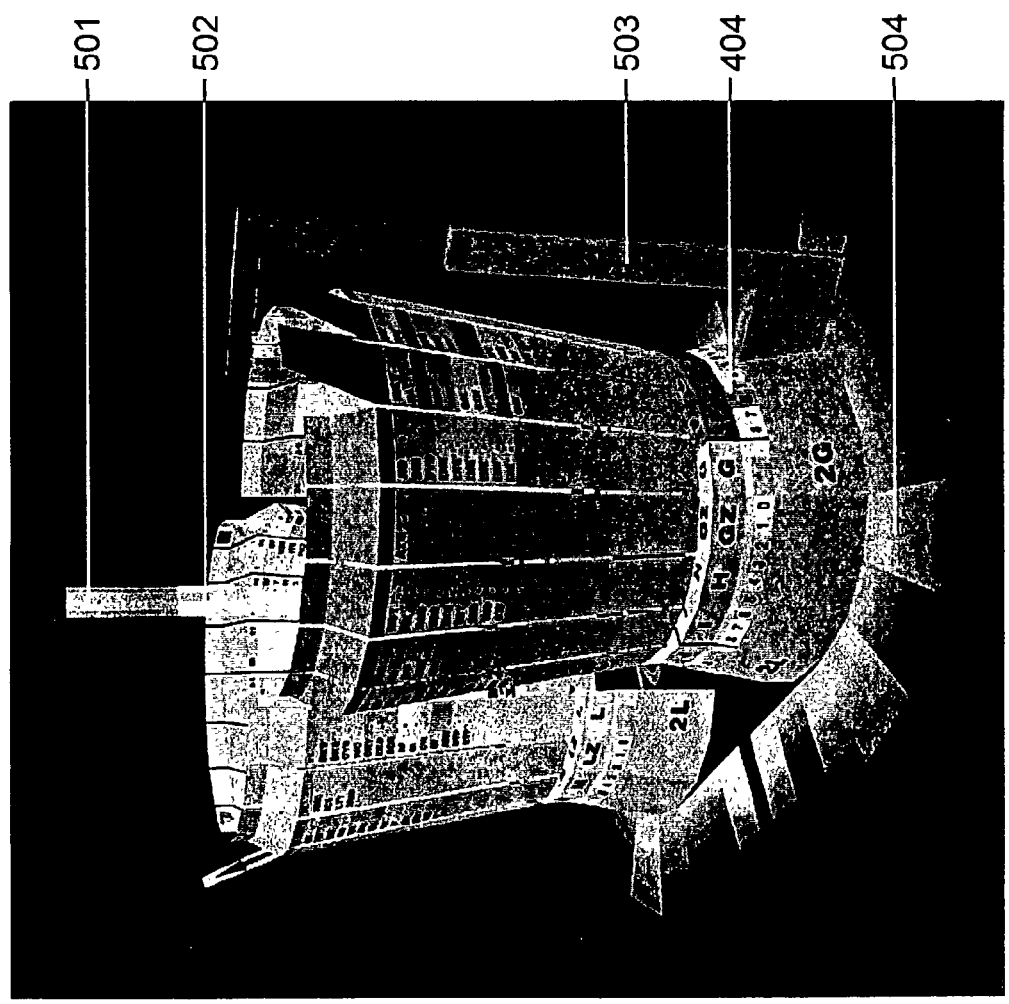
FIG. 5 is another image generated by the FIG. 1 system showing a second drill down detailed view of a virtual trading post.

Exception condition flags and display segments of a trading post can be color coded to indicate the nature of the exception condition. For example, a yellow flag and segment color can be used to indicate that trading in a security has not opened. A purple flag can be used to indicate "hot" news with respect to a security. Other colors can indicate a trading halt, an equipment problem, or exceptional trading volume. Access to other information relevant to a particular trading post can be provided by additional panels, such as for order books 404 at the base of the virtual trading post 202. Color coding of display surfaces 405 can be used to provide status information, such as for a particular specialist's book of limit orders. Other information that can be provided by the trading post for quick recognition is shown in FIG. 5, which include a thermometer 501, a queue indicator 502, a T-lock 503, and a activity map 504.

Figure 6:
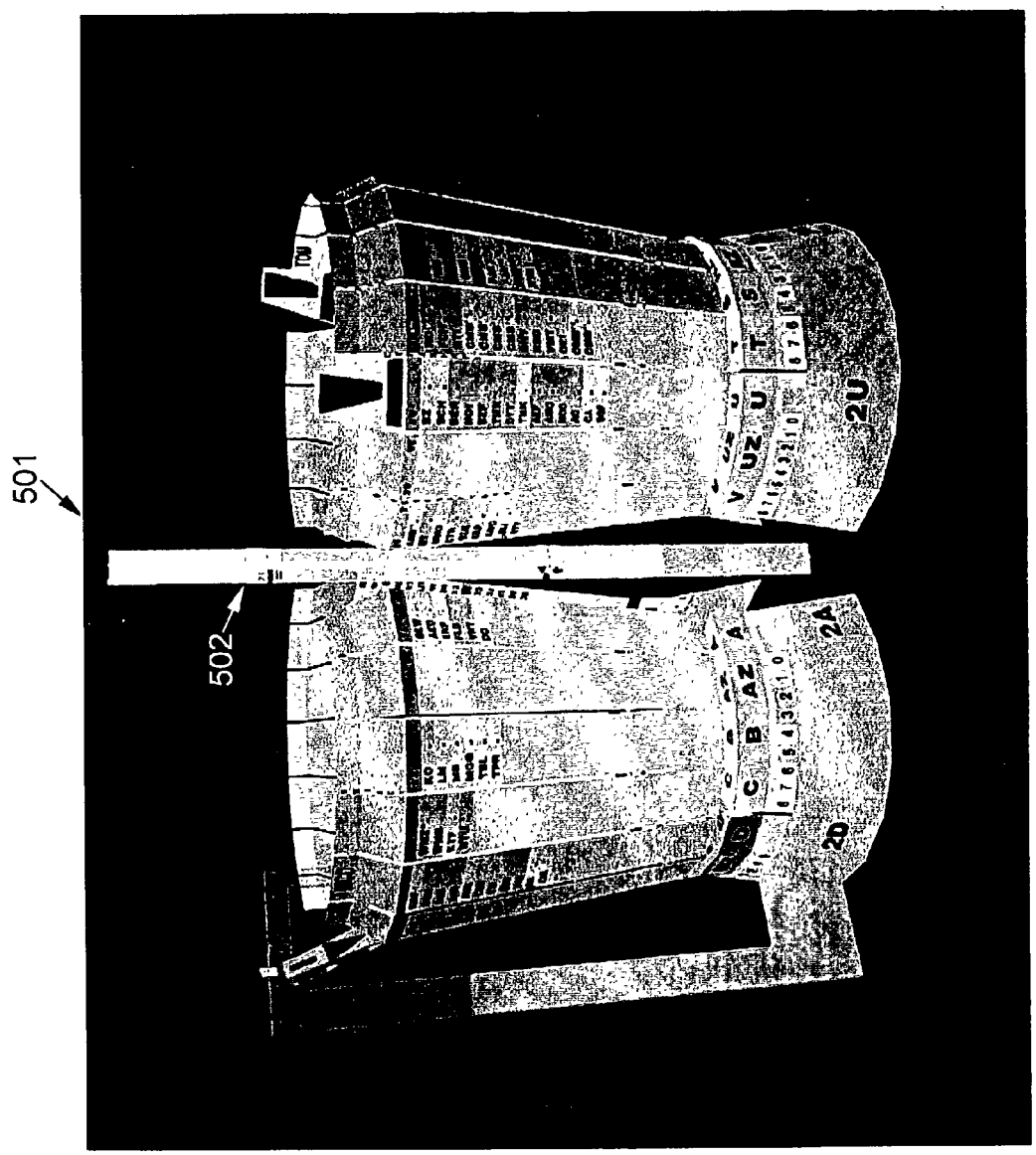
FIG. 6 is another image generated by the FIG. 1 system showing a third drill down detailed view of a virtual trading post and a thermometer.

A thermometer 501 can be provided between the two columns of the virtual trading post 202. FIG. 6 shows a detailed view of the thermometer 501. The thermometer 501 indicates the number of business alerts or exceptions on a trading post 202. A detailed view of the thermometer 501 for a virtual trading post 202 is accessible by selecting the thermometer 501 in the fullfloor view depicted in FIGS. 2 and 3. Indicators for each type of business exception relative to trades, velocity and prices changes move up and down the thermometer relative to the number of securities at the trading post 202 for each type of exception. The area of the thermometer between each indicator and the thermometer can also change color tint. Each type of color tint is relatively transparent so that superposition of different tints can further differentiate the several indicators. Selecting the thermometer in the drill down view depicted in FIGS. 5 and 6 triggers information about the affected stocks to appear in the dashboard 208.

Figure 7:
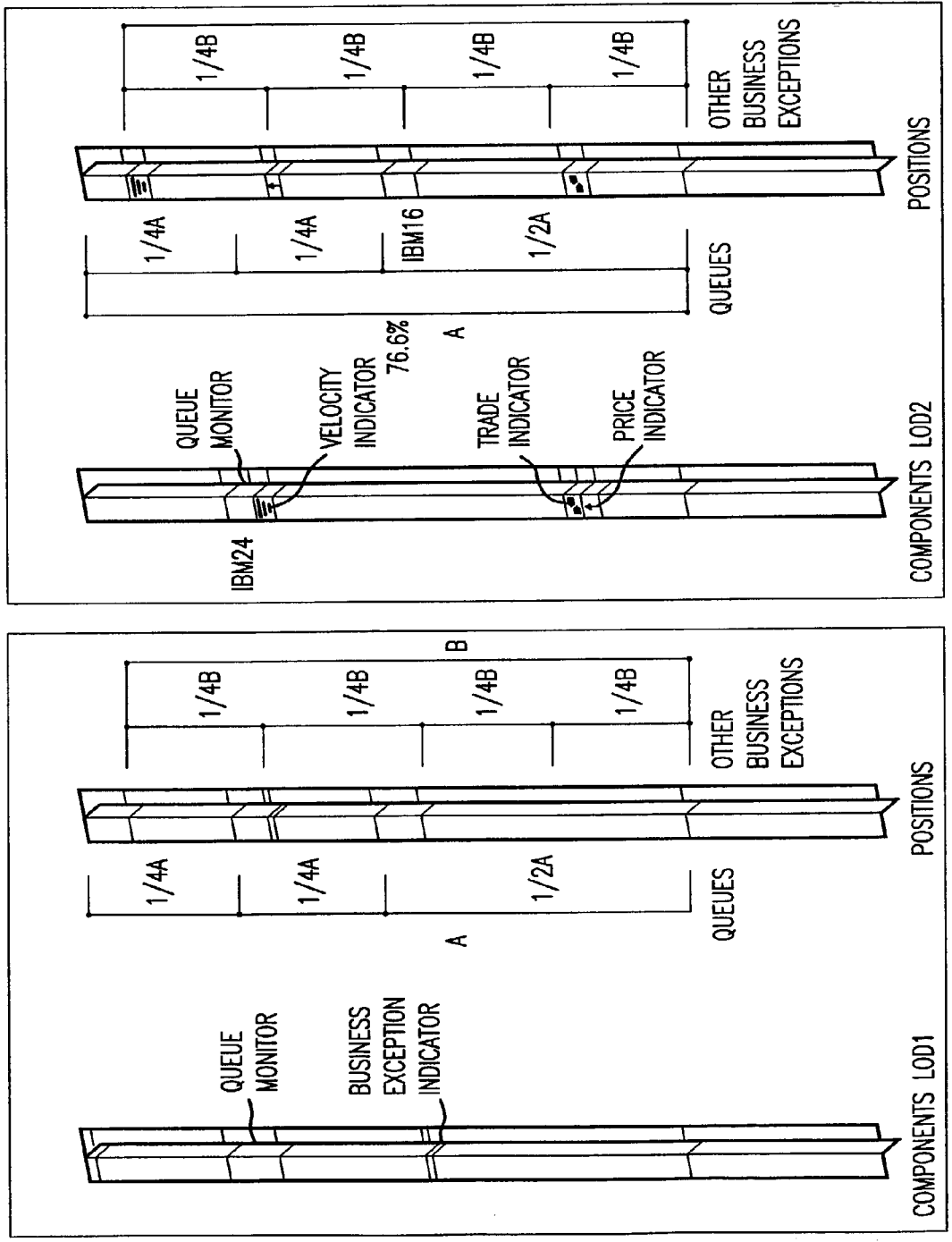
FIG. 7 is another image generated by the FIG. 1 system showing a drilldown detailed view of a thermometer.

A queue indicator 502 on the thermometer 501 can be provided to indicate the status of the buildup of order processes at the trading post and moves according to the highest level of queues found on a security at that post. As depicted in FIG. 7, the queue indicator, located at the upper half of the thermometer 501, can differentiate between three queue levels. Separately, the tint of a thermometer 501 can be provided to rise at four different positions to reflect the quantity of other business exceptions at the post. The indicator can remain yellow colored in the drill down view. In addition, the stock symbol of the stock with the highest queue is indicated as well as the number of the actual order queue.

A T-lock 503 can be provided for indicating a system alert while also monitoring the state of recovery of a system. As the system recovers, the T-lock 503 can provide such an indication by becoming gradually transparent.

Figure 8:
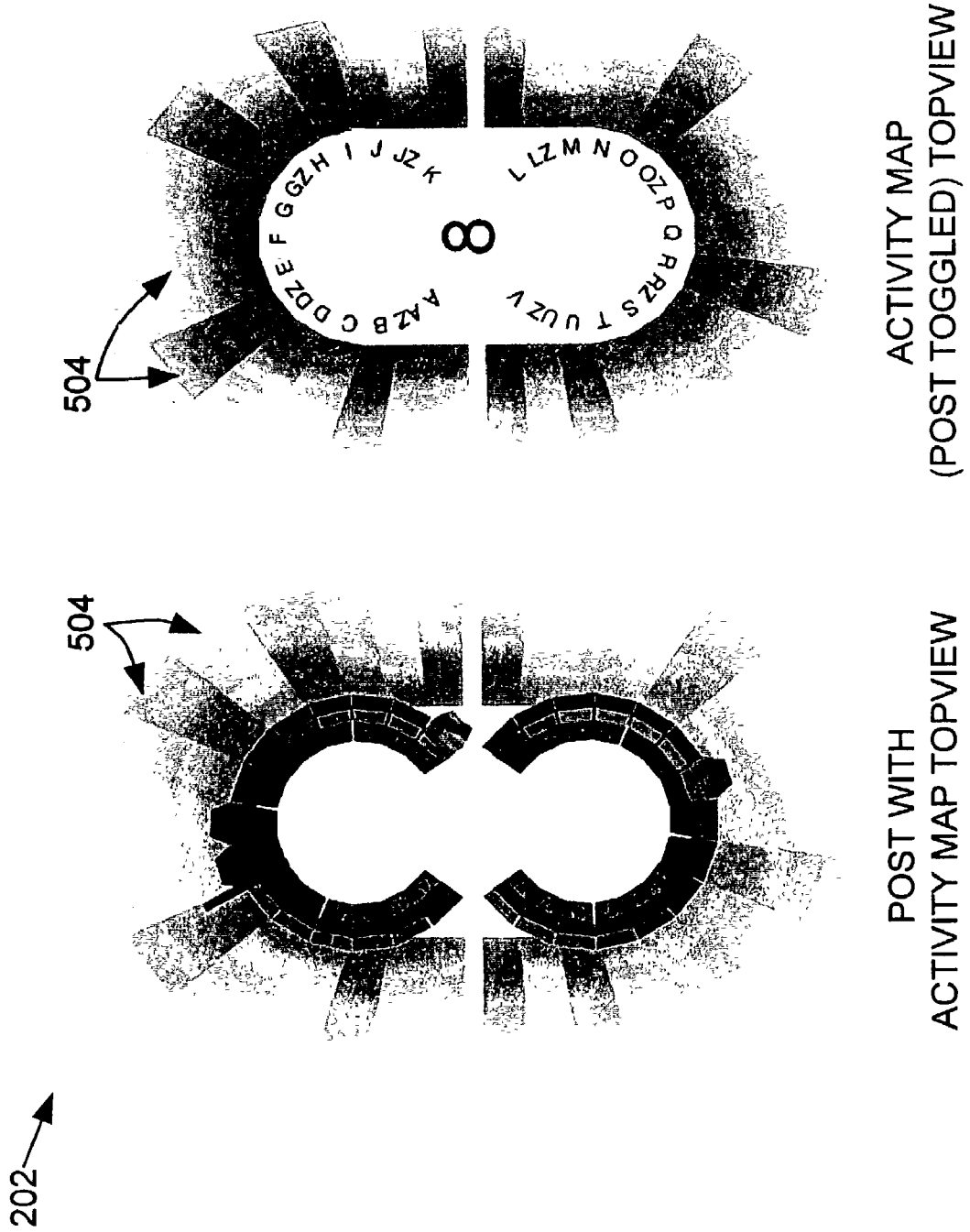
FIG. 8 is another image generated by the FIG. 1 system showing a second drill down view of a thermometer from a top down perspective.

A activity map 504 can be provided to indicate the level of activity of each display panel for a particular stock attribute. As depicted in FIG. 8, the activity map 504 displays a gradient ramp to indicate changes in activity intensity level. As activity at the panel increases, a texture of the complete ramp is mapped at different positions relative to the activity map 504 floor polygon to reveal a more or less intense portion of the gradient. The activity map 504 can display four different portions of the complete gradient texture and can be toggled on or off. Similarly, other features of the virtual trading floor 201 can be toggled on and off to show more or less information for various levels of view. The activity map 504 or meter can be provided to alert a user to business events at a post related to aggregate stock activity. Changes in activity can be represented as a pulsing of the activity meter in the model's floor. Values represented in the activity meter can include total volume, total trades, NYSE block trade spread, net percentage change, net dollar value change, trade velocity and specialist orders. The interactive decision support system 101 can be provided to learn and adjust to normal levels of systems activity and thereby set new thresholds. Movements to and through learned thresholds generate alerts to the user.

A background wall 204 can be provided with four panels 207, three of which are visible from a three dimensional side view as depicted in FIGS. 2 and 3. The background wall 204 can have at least one ticker tape 203, information panels, streaming video panels, as well as advertizement panels and corporate logo panels. As the three dimensional model is turned, the wall nearest the user automatically disappears, allowing an open view of the trading floor surrounded by the three visible panels of the back wall.

The system facilities 205 is a three dimensional representation of the layout for the operations systems maintaining the data servers 106. The system facilities 205 are provided behind the rearmost panel 207 of the background wall 204 and can be made visible by dropping the back most panel 207. The facilities 205 graphically represent all the domain elements of the network map. Domain elements can include a specialist book domain in which stock are aggregated into computers, a booth domain in which brokers can be aggregated into containers, as well as host domains in which computers and mainframes can be aggregated, For the model of the New York Stock Exchange®, the facilities are divided into two symmetrical areas representing the two separate physical locations of the two facilities.

The system facilities 205 are organized by domain in horizontal drawers according to function, e.g., for the display book and specialist book and support systems. Statistics for support systems can include CPU utilization, system resources, status of booth application units and associated trade processes. A status summary of the elements of a drawer can be displayed on the front surface of the drawer. Each domain can be activated by a domain button and slid out as a drawer for a drill down view to a specific element within the domain, i.e. server, etc. This feature of the invention provides for efficient crisis management and day to day monitoring of trading floor activity. The system may also be employed in remote locations for management oversight. Accordingly, the model provides for visualization of alert conditions at systems facilities.

As depicted in FIG. 3, a dashboard 301 is provided below the three dimensional view of the virtual trading floor 202 and displays two-dimensional numerical and symbolic information of immediate interest to a user. The dashboard 301 can be separated into several categories for detailed lists: a system dashboard 302, a user selected dashboard 303, and a business dashboard 304. In addition, an upper section of the dashboard can perform as a menu bar 305 and a summary bar 306 for summarizing the contents of each of the several dashboards and providing data which can be customized as desired by the user. Portions of the summary bar can popup to provide general information on an item or condition, followed by more detailed information in the dashboards below. Inference and correlation engines can generate information to be provided in the dashboard or in the "drill down" view to reveal relationships between business events.

The business dashboard 304 can include a business message board and an exceptions list for a quick look of various conditions. The user selected dashboard 303 can include information on a particular thermometer, a queue monitor, business exceptions being tracked, and a window for displaying other information selected by a user. A detailed view of the exceptions list can be invoked by selecting the exceptions list for a drill down view. Selecting a stock in the user selected dashboard can call up a detailed view of the stock information into the three dimensional graphical display area of the virtual trading floor 201 shown in FIGS. 2 and 3.

The system dashboard 302 can also include a system message board, alert lists and a recovery tank for the recovery status of various systems. The system dashboard can provide an overview and monitoring function by displaying the total number of system alerts displayed.

Several containers 206 can be provided in the floor area of the interactive system 201 which contain three dimensional graphical information of immediate interest to a user. The several containers 206 can contain information such as facilities status, securities group statistics, as well as market index statistics.

An index container 309 can be provided for graphically displaying market index statistics in real time. The index container 309 can contain up to four slices, each of them showing a time line and five scale lines which are labeled relative to the scale of the indexes being tracked. As live streaming data is received throughout a trading session, the index ribbons in the index container 309 which can track index information, such as volume or price, proceed from left to right. The index container 309 can be selected for a drill down view to give a user the ability to choose the indexes to be monitored, select the speed of the tracking, change the period of tracking, change the viewpoint, lift index slices and retrieve comparison devices among other things. The user can lift an individual slice from the index container 309 to get a better view of a single index. Current statistics, such as volume or price, can be displayed numerically inside the leading edge of the graph line.

A group container 308 can be provided for graphically displaying statistics for a group of stocks or other traded items in real time. A group can include items such as stocks in alert condition, indexes, high profile stocks with news, user defined stocks, or stocks within a particular market sector (i.e., industrial), region (i.e., Europe) or country. Statistics for each stock can include volume, net price change, net percentage change, spread, order velocity, order queues, and trade reports. As with the index containers, a detailed view of the group container can be had by selecting the group container and drilling down. In addition, a drawer of characteristics for an individual stock or a slice of characteristics for a group of stocks can be lifted out of the group container for easier viewing.

Since display surfaces 405 and display panels 404 are located around the periphery of the virtual trading posts 202 to provide information in a three-dimensional format, generally only a portion of the display surfaces 405 and display panel 404 are visible to a user at any one time. Accordingly, navigation and display settings can be provided by a user through a control station 114 or user input to provide dynamic, interactive control of one or more two dimensional views of the three dimensional model.

The interactive decision support system displays information in a manner which permits the user with a means to investigate detailed information while maintaining an overview of information concerning the major events affecting the trading floor. The large scale view of the three-dimensional model of the trading floor as shown in FIG. 2 provides immediate display of major information such as "hot news", important information about specific traded securities displayed on the consolidated ticker tape, and trading booth status indicators among other things. A display can be provided of a two dimensional view of the three dimensional model of the trading floor that simulates the view from an overhead camera that pans and zooms throughout the three-dimensional model thereby providing a birds-eye view and allowing a user to navigate throughout the virtual trading floor 201. As a user pans and zooms throughout the three-dimensional model, more detailed information can be viewed without losing quick access to the information concerning the major events.

The user can select an aspect view within the virtual area defined by the large scale view of the virtual trading floor and zoom to a close-up view of the virtual trading floor from the perspective of that point. The operator can further navigate through the virtual trading floor for a close up view of a trading booth without calling up a windowed view of the trading booth and thus the operator can continue to monitor other information peripheral to that particular trading booth. By selecting a particular stock symbol, detailed information about that stock such as corporate name, industry, country group, index member, specialist firm name, last sale data, terminal address among other things, without losing the large scale view. Alternatively, the operator can select the system information portion of the trading post and obtain a detailed "drill down" window of the status of the information systems handling the trading functions of that trading post.

As a user zooms and pans through the three dimensional space of the trading floor, detailed views of specific items can be viewed in "drill down" mode by selecting the item to be viewed. The "drill down" function is incorporated only into specific portions of the three dimensional model and provides detailed information and access to additional information and options to utilize additional analytic functionality associated with that information. Large scale elements such as the trading posts 202 or the index container can be selected for a drill down view comprising these elements. Small scale elements such as individual panels 405 on the trading posts 202 or individual stocks symbols or exceptional events located on these panels or on the background wall 204 can also be individually selected for drill down view.

The detailed view shown in "drill down" mode can be a separate window in the display as depicted in FIG. 3 or can be provided in a separate display as depicted in FIG. 4. Once an aspect of the virtual trading floor 201 is selected, such as a trading post 202 or a container having historical information about an index or system information, the specialized data display may be invoked by special command such as command icons listed on the menu bar 305 as shown in FIG. 3 or by using a drop-down list which can be called up with a pointing device. As the operator moves the pointing device over an area of a large scale view which offers a "drill down" option, the pointer can change its visual aspect thereby indicating the "drill down" availability to the operator. For example, after a user has selected a particular trading post in the large scale view "drilled down" to a windowed view of the particular trading post, system displays a detailed view of the trading post with associated financial and system information. The user can then select a particular aspect of the trading post, such as an individual security or system information handled by that trading post, and obtain additional detailed information about that aspect in another "drill down" window. Additional "drill down" views can be made available, such as the order book for a particular security.

While an operator is viewing various levels of detail through the drill down or zoom function of the virtual trading floor, the operator can continue to monitor specified information specified to be maintained in the dashboard. As the user views information in the three dimensional representation of the trading floor, various types of data can be selected and added to the dashboard for quick reference by special command, such as a drop down list which can be invoked by the pointing device.

Figure 9:
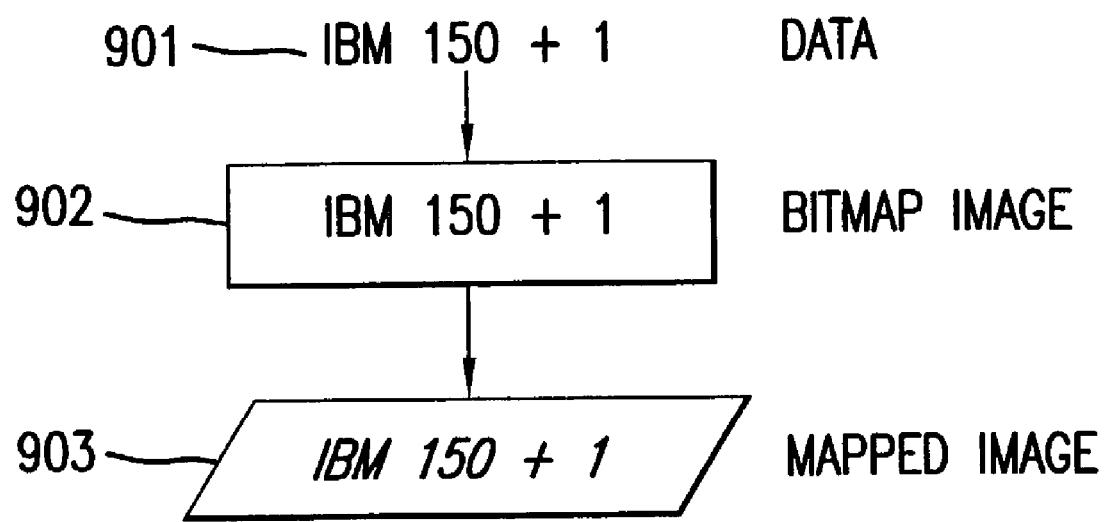
FIG. 9 is an illustration of how the FIG. 1 system maps data to a surface and converts the surface to a three-dimensional image.

The implementation of the three dimensional model of the trading floor as a database can be done by conventional methods and includes the definition of display surfaces 405. Data, such as alphanumeric, image or graphic data, which is to be displayed on such surfaces in the two dimensional views of the three dimensional model is mapped onto two dimensional surfaces corresponding to a normal view of the surfaces. The two dimensional normal views of the surfaces are then mapped onto a two dimensional projection of the surface of the three dimensional model as depicted in a two dimensional view to be displayed. This process is illustrated in FIG. 9, which shows alphanumeric data 901 being converted to a planar display 902 using conventional character font/display generation technique. The resulting normal image 902 is then mapped into the display segment of the three dimensional model as viewed in a two dimensional image 903, which may require (1) scaling to the image size, and (2) skewing to the image view in both horizontal and vertical directions. In the process, image elemental pixels in two dimensional view 903 are mapped to image elements in normal image model 902 to determine whether the image pixel will be black or white. This creates the illusion of viewing the data on an actual display panel of the three dimensional model. Video or graphic images are similarly mapped, including data relating to image luminance, color and intensity.

Although the present invention has been described in connection with specific exemplary embodiments, it should be understood that various changes, substitutions and alterations can be made to the disclosed embodiments without departing from the spirit and scope of the invention as set forth in the appended claims.

We claim:

1. A method for managing trading and system activity in a trading exchange, the method comprising
   at a centralized location, providing a visual display of trading exchange activity including systems activity and trading activity to a trading exchange supervisor or manager; and
   providing an interactive decision support interface coupled to the visual display of trading exchange activity;
   wherein providing the visual display of trading exchange activity comprises:
      maintaining data representing a three dimensional model of said exchange's trading areas, said model including surfaces;
      receiving and maintaining in a computer memory data representing trading exchange activity;
      generating a two dimensional display representing an aspect view of said three dimensional model selected via the interactive decision support interface, said two dimensional display including perspective views of at least some of said surfaces of said model;
      generating alphanumeric images of selected data representing trading
      exchange activity; and mapping said alphanumeric images onto selected ones of said perspective views.

2. A method as specified in claim 1 wherein there is provided the further steps of:
   changing said selected aspect view of said three dimensional model;
   generating a further two dimensional display representing said changed aspect view, said further two dimensional display including further perspective views of at least some of said surfaces of said model; and mapping said alphanumeric images onto selected ones of said further perspective views in said further two-dimensional display.

3. method as specified in claim 1 wherein portions of said two dimensional display are selectable, said selectable display portions being operable when selected for displaying further data correlated to said selectable display portions.

4. method as specified in claim 3 wherein at least some of said selectable display portions comprise said perspective aspect views, and wherein said further data is correlated to data represented by said alphanumeric images mapped onto said perspective aspect views.

5. A method as specified in claim 4, wherein said alphanumeric images comprise identification of said securities.

6. The method of claim 1, further comprising using the interactive decision support interface for at least one of:
   ensuring and enforcing compliance with the trading exchange's financial and operational requirements;
   checking on brokers' sales practices; and monitoring specialist operations.

7. A method for displaying data representing the operation of an exchange having a trading area including a plurality of trading posts whereat selected securities are traded, comprising:
   at a centralized location, providing a visual display of trading exchange activity including systems activity and trading activity to a trading exchange supervisor or manager; and
   providing an interactive decision support interface coupled to the visual display of trading exchange activity,
      wherein providing the visual display of trading exchange activity comprises:
         maintaining data representing a three-dimensional model of said exchange trading area, said model including model portions representing said trading posts;
         receiving and maintaining in a computer memory data representing trading of said securities; and
         generating a two dimensional display representing an aspect view of said three dimensional model selected via the interactive decision support interface, said selected aspect view including one or more of said model portions representing said trading posts, said model portions having selectable parts being selectable and operative when selected to display further data from said computer memory correlated to said selected parts.

8. A method as specified in claim 7, wherein said model portions representing said trading posts include surfaces and wherein said step of generating a two-dimensional display further comprises:
   generating alphanumeric images relating to securities traded at a selected trading post and mapping said alphanumeric images into selected ones of said surfaces in said two-dimensional display, and wherein said surfaces being operative when selected to display further data correlated to said related securities.

9. A method as specified in claim 7, further comprising:
   analyzing said data representing trading of said securities and identifying exceptional conditions relating thereto, generating image portions representing said exceptional conditions, and displaying said exceptional condition image portions in said two-dimensional display in correlation with display of model portions representing said trading posts at which said securities are traded.

10. A method as specified in claim 9 wherein said exceptional condition image portions are selectable and operative when selected to display further data concerning said exceptional condition.

11. A method as specified in claim 7, further comprising:
    monitoring data processing systems used in said exchange;
    identifying exceptional conditions in said data processing systems and the locations of said exchange effected by said exceptional conditions; and
    generating image portions representing exceptional conditions of said data processing systems and displaying said exceptional condition image portions in said two dimensional display in correlation with said location of said exchange.

12. A system for managing trading and system activity in a trading exchange, the system comprising:
    at a centralized location, a visual display of trading exchange activity including systems activity and trading activity;
    an interactive decision support interface coupled to the visual display of trading exchange activity; and
    a computer system, configured and programmed to:
       (a) maintain data representing a three dimensional model of said exchange trading area, said model including surfaces;
       (b) receive data from at least one data source;
       (c) format and normalize said data to provide formatted data of a predetermined format;
       (d) store and update said formatted data in at least one memory area;
       (e) generate a two dimensional display image of a three dimensional model from an aspect view of said three dimensional model selected via the interactive decision support interface, said display image having perspective views of at least some of said surfaces of said model;
       (f) generate alphanumeric images of selected data;
       (g) map said alphanumeric images onto selected ones of said perspective views; and
       (h) receive commands designating said aspect view and for retrieving further data and updating said display image.

13. system for providing an interactive display of data as specified in claim 12 wherein the computer system is further configured and programmed to:
    change said selected aspect view of said three dimensional model;
    generate a further two dimensional display representing said changed aspect view, said further two dimensional display including further perspective views of at least some of said surfaces of said model; and
    map said alphanumeric images onto selected ones of said further perspective views in said further two-dimensional display.

14. A system for providing an interactive display of data as specified in claim 12 wherein portions of said two dimensional display are selectable, said selectable display portions being operable when selected for displaying further data correlated to said selectable display portions.

15. A system for providing an interactive display of data as specified in claim 14 wherein at least some of said selectable display portions comprise said perspective aspect views, and wherein said further data is correlated to data represented by said alphanumeric images mapped onto said perspective aspect views.

16. A system for displaying data representing the operation of a trading exchange having a trading area including a plurality of trading posts whereat selected securities are traded, the system comprising:
- a visual display of trading exchange activity including systems activity and trading activity,
- an interactive decision support interface coupled to the visual display of trading exchange activity; and
- a computer system, configured and programmed to:
  - maintain data representing a three-dimensional model of said trading area, said model including model portions representing said trading posts;
  - receive and maintain in a computer memory data representing trading of said securities;
  - generate a two dimensional display representing an aspect view of said three dimensional model selected via the interactive decision support interface, said selected aspect view including one or more of said model portions representing said trading posts, said model portions having selectable parts being selectable and operative when selected to display further data from said computer memory correlated to said selected parts.

17. A system for displaying data representing the operation of an exchange as specified in claim 16, wherein said model portions representing said trading posts include surfaces and wherein the computer system is further configured and programmed to:
- generate alphanumeric images relating to securities traded at a selected trading post and
- map said alphanumeric images into selected ones of said surfaces in said two-dimensional display, and wherein said surfaces being operative when selected to display further data correlated to said related securities.

18. A system for displaying data representing the operation of an exchange as specified in claim 17, wherein said alphanumeric images comprise identification of said securities.

19. A system for displaying data representing the operation of an exchange as specified in claim 16, wherein the computer system is further configured and programmed to:
- analyze said data representing trading of said securities and identifying exceptional conditions relating thereto;
- generate image portions representing said exceptional conditions; and
- display said exceptional condition image portions in said two-dimensional display in correlation with said display of model portions representing said trading posts at which said securities are traded.

20. A system for displaying data representing the operation of an exchange as specified in claim 19 wherein said exceptional condition image portions are selectable and operative when selected to display further data concerning said exceptional condition.

21. A system for displaying data representing the operation of an exchange as specified in claim 16, wherein the computer system is further configured and programmed to:
- monitor data processing systems used in said exchange;
- identify exceptional conditions in said data processing systems and the locations of said exchange effected by said exceptional conditions;
- generate image portions representing exceptional conditions of said data processing systems; and
- display said exceptional condition image portions in said two dimensional display in correlation with said location of said exchange.

22. A system for displaying data representing the operation of an exchange as specified in claim 16, wherein the computer system is further configured and programmed to receive and maintain in a computer memory real time and historical data integrated from several sources representing trading of said securities.

23. A system for displaying data representing the operation of an exchange as specified in claim 16, wherein the computer system is further configured and programmed to receive and maintain in a computer memory real time and historical data integrated from several sources representing trading of said securities and normalized market data.

* * * * *